US006998727B2

(12) United States Patent
Gray, Jr.

(10) Patent No.: US 6,998,727 B2
(45) Date of Patent: Feb. 14, 2006

(54) METHODS OF OPERATING A PARALLEL HYBRID VEHICLE HAVING AN INTERNAL COMBUSTION ENGINE AND A SECONDARY POWER SOURCE

(75) Inventor: Charles L. Gray, Jr., Pinckney, MI (US)

(73) Assignee: The United States of America as represented by the Administrator of the Environmental Protection Agency, Washington, DC (US)

( * ) Notice: Subject to any disclaimer, the term of this patent is extended or adjusted under 35 U.S.C. 154(b) by 180 days.

(21) Appl. No.: 10/386,029

(22) Filed: Mar. 10, 2003

(65) Prior Publication Data
US 2004/0178635 A1 Sep. 16, 2004

(51) Int. Cl.
B60L 11/14 (2006.01)
F02N 11/06 (2006.01)
H02P 9/04 (2006.01)
E05C 1/06 (2006.01)
E05C 1/12 (2006.01)

(52) U.S. Cl. .................. 290/40 C; 290/40 A; 290/51
(58) Field of Classification Search .............. 290/40 A, 290/40 C, 51
See application file for complete search history.

(56) References Cited

U.S. PATENT DOCUMENTS

| 4,335,429 A | | 6/1982 | Kawakatsu ................ 364/424 |
| 4,351,405 A | * | 9/1982 | Fields et al. ............... 180/65.2 |
| 4,363,999 A | * | 12/1982 | Preikschat .................. 318/53 |
| 4,407,132 A | * | 10/1983 | Kawakatsu et al. ........... 60/716 |
| 4,547,678 A | * | 10/1985 | Metzner et al. ........... 290/40 C |
| 4,908,553 A | * | 3/1990 | Hoppie et al. .............. 318/382 |
| 5,081,365 A | | 1/1992 | Field et al. .................... 290/45 |
| 5,176,213 A | | 1/1993 | Kawai et al. ................ 180/243 |
| 5,291,960 A | * | 3/1994 | Brandenburg et al. ...... 180/65.2 |
| 5,327,987 A | | 7/1994 | Abdelmalek ............... 180/65.2 |
| 5,358,317 A | * | 10/1994 | Cikanek ...................... 303/152 |
| 5,359,308 A | * | 10/1994 | Sun et al. ................... 335/216 |
| 5,376,869 A | * | 12/1994 | Konrad ....................... 318/587 |
| 5,403,244 A | * | 4/1995 | Tankersley et al. ........... 477/20 |
| 5,406,126 A | * | 4/1995 | Hadley et al. ................ 290/45 |
| 5,450,324 A | * | 9/1995 | Cikanek ..................... 701/108 |
| 5,495,912 A | | 3/1996 | Gray, Jr. et al. ............ 180/165 |
| 5,511,859 A | * | 4/1996 | Kade et al. ..................... 303/3 |
| 5,549,087 A | | 8/1996 | Gray, Jr. et al. ............ 123/254 |
| 5,562,079 A | | 10/1996 | Gray, Jr. ..................... 123/276 |
| 5,568,023 A | * | 10/1996 | Grayer et al. ............... 318/139 |

(Continued)

FOREIGN PATENT DOCUMENTS

DE 200 14 160 U1 12/2001

(Continued)

Primary Examiner—Darren Schuberg
Assistant Examiner—Pedro J. Cuevas
(74) Attorney, Agent, or Firm—Seed Intellectual Property Law Group PLLC

(57) ABSTRACT

The invention is directed toward methods for operating a parallel hybrid vehicle in a manner that responds to the operator's demand for power output, while maximizing engine efficiency and minimizing disruptions in vehicle drivability. According to principles of the present invention, when the driver of a hybrid vehicle makes a demand for power output immediately after a braking event, the power provided to meet the initial demand is from either an ICE or a secondary power source. Which power source is used, and when it is engaged and disengaged, depends on various vehicle operating conditions. Also, the ICE is selectively turned off and on in response to various operating conditions.

58 Claims, 9 Drawing Sheets

U.S. PATENT DOCUMENTS

| | | | | |
|---|---|---|---|---|
| 5,579,640 | A | 12/1996 | Gray, Jr. et al. | 60/413 |
| 5,589,743 | A * | 12/1996 | King | 318/139 |
| 5,608,308 | A * | 3/1997 | Kiuchi et al. | 322/11 |
| 5,609,131 | A | 3/1997 | Gray, Jr. et al. | 123/299 |
| 5,611,300 | A | 3/1997 | Gray, Jr. | 123/48 A |
| 5,614,809 | A * | 3/1997 | Kiuchi et al. | 322/11 |
| 5,617,823 | A | 4/1997 | Gray, Jr. et al. | 123/254 |
| 5,621,304 | A * | 4/1997 | Kiuchi et al. | 322/18 |
| 5,659,240 | A * | 8/1997 | King | 320/134 |
| 5,698,955 | A | 12/1997 | Nii | 318/139 |
| 5,707,115 | A * | 1/1998 | Bodie et al. | 303/3 |
| 5,725,064 | A * | 3/1998 | Ibaraki et al. | 180/65.2 |
| 5,778,326 | A | 7/1998 | Moroto et al. | 701/22 |
| 5,789,882 | A | 8/1998 | Ibaraki et al. | 318/148 |
| 5,791,427 | A * | 8/1998 | Yamaguchi | 180/65.3 |
| 5,806,617 | A | 9/1998 | Yamaguchi | 180/65.2 |
| 5,818,116 | A * | 10/1998 | Nakae et al. | 290/38 R |
| 5,842,534 | A | 12/1998 | Frank | 180/65.2 |
| 5,867,009 | A * | 2/1999 | Kiuchi et al. | 322/16 |
| 5,887,674 | A | 3/1999 | Gray, Jr. | 180/307 |
| 5,898,282 | A * | 4/1999 | Drozdz et al. | 318/139 |
| 5,899,828 | A | 5/1999 | Yamazaki et al. | 477/4 |
| 5,915,489 | A * | 6/1999 | Yamaguchi | 180/65.2 |
| 5,915,801 | A * | 6/1999 | Taga et al. | 303/152 |
| 5,927,415 | A * | 7/1999 | Ibaraki et al. | 180/65.2 |
| 5,951,614 | A * | 9/1999 | Tabata et al. | 701/54 |
| 5,965,991 | A * | 10/1999 | Koike et al. | 318/139 |
| 5,984,033 | A | 11/1999 | Tamagawa et al. | 180/65.2 |
| 6,026,921 | A | 2/2000 | Aoyama et al. | 180/65.2 |
| 6,054,844 | A | 4/2000 | Frank | 322/16 |
| 6,057,605 | A * | 5/2000 | Bourne et al. | 290/40 C |
| 6,067,801 | A * | 5/2000 | Harada et al. | 60/705 |
| 6,083,138 | A | 7/2000 | Aoyama et al. | 477/5 |
| 6,116,363 | A | 9/2000 | Frank | 180/65.2 |
| 6,123,163 | A | 9/2000 | Otsu et al. | 180/65.8 |
| 6,131,538 | A * | 10/2000 | Kanai | 123/2 |
| 6,137,250 | A | 10/2000 | Hirano et al. | 318/376 |
| 6,155,954 | A | 12/2000 | Itoyama et al. | 477/5 |
| 6,170,524 | B1 | 1/2001 | Gray, Jr. | 137/625.18 |
| 6,173,574 | B1 * | 1/2001 | Obayashi et al. | 60/710 |
| 6,186,126 | B1 | 2/2001 | Gray, Jr. | 123/557 |
| 6,189,493 | B1 | 2/2001 | Gray, Jr. | 123/52.4 |
| 6,190,282 | B1 | 2/2001 | Deguchi et al. | 477/5 |
| 6,202,416 | B1 | 3/2001 | Gray, Jr. | 60/620 |
| 6,203,468 | B1 * | 3/2001 | Nitta et al. | 477/5 |
| 6,215,198 | B1 | 4/2001 | Inada et al. | 290/40 C |
| 6,216,462 | B1 | 4/2001 | Gray, Jr. | 60/616 |
| 6,232,733 | B1 | 5/2001 | Obayashi et al. | 318/432 |
| 6,253,866 | B1 | 7/2001 | Kojima | 180/65.2 |
| 6,269,290 | B1 | 7/2001 | Egami et al. | 701/22 |
| 6,278,915 | B1 | 8/2001 | Deguchi et al. | 701/22 |
| 6,290,012 | B1 | 9/2001 | Matsubara et al. | 180/65.4 |
| 6,301,888 | B1 | 10/2001 | Gray, Jr. | 60/605.2 |
| 6,301,891 | B1 | 10/2001 | Gray, Jr. | 60/616 |
| 6,307,277 | B1 | 10/2001 | Tamai et al. | 290/40 |
| 6,317,665 | B1 | 11/2001 | Tabata et al. | 701/22 |
| 6,318,486 | B1 | 11/2001 | Masaki | 180/65.2 |
| 6,318,487 | B1 * | 11/2001 | Yanase et al. | 701/22 |
| 6,321,143 | B1 | 11/2001 | Phillips et al. | 701/22 |
| 6,321,144 | B1 * | 11/2001 | Crombez | 701/22 |
| 6,326,702 | B1 | 12/2001 | Yonekura et al. | 290/40 |
| 6,328,670 | B1 * | 12/2001 | Minowa et al. | 477/5 |
| 6,330,498 | B1 | 12/2001 | Tamagawa et al. | 701/22 |
| 6,334,079 | B1 | 12/2001 | Matsubara et al. | 701/22 |
| 6,343,252 | B1 | 1/2002 | Asami et al. | 701/113 |
| 6,345,216 | B1 * | 2/2002 | Morimoto et al. | 701/22 |
| 6,346,064 | B1 * | 2/2002 | Hada et al. | 477/171 |
| 6,352,489 | B1 | 3/2002 | Kuroda et al. | 477/5 |
| 6,358,180 | B1 | 3/2002 | Kuroda et al. | 477/4 |
| 6,367,570 | B1 | 4/2002 | Long, III et al. | 180/65.2 |
| 6,369,539 | B1 | 4/2002 | Morimoto et al. | 318/369 |
| 6,371,889 | B1 * | 4/2002 | Kuroda et al. | 477/181 |
| 6,373,206 | B1 | 4/2002 | Morimoto et al. | 318/139 |
| 6,376,927 | B1 * | 4/2002 | Tamai et al. | 290/40 C |
| 6,377,007 | B1 * | 4/2002 | Ozaki et al. | 318/432 |
| 6,381,522 | B1 * | 4/2002 | Watanabe et al. | 701/22 |
| 6,394,209 | B1 | 5/2002 | Goehring et al. | 180/65.4 |
| 6,405,121 | B1 * | 6/2002 | Tamura et al. | 701/96 |
| 6,415,607 | B1 | 7/2002 | Gray, Jr. | 60/616 |
| 6,415,897 | B1 * | 7/2002 | Sugimoto et al. | 188/353 |
| 6,435,294 | B1 | 8/2002 | Hara et al. | 180/65.4 |
| 6,460,500 | B1 * | 10/2002 | Ooyama et al. | 123/179.3 |
| 6,469,402 | B1 * | 10/2002 | Morimoto et al. | 290/40 C |
| 6,473,683 | B1 * | 10/2002 | Nada | 701/82 |
| 6,476,573 | B1 * | 11/2002 | Omata et al. | 318/445 |
| 6,532,926 | B1 * | 3/2003 | Kuroda et al. | 123/179.4 |
| 6,621,175 | B1 | 9/2003 | Kuroda et al. | 290/40 D |
| 6,622,078 | B1 * | 9/2003 | Kuragaki et al. | 701/96 |
| 6,625,534 | B1 * | 9/2003 | Suzuki et al. | 701/62 |
| 6,634,447 | B1 | 10/2003 | Matsubara et al. | 180/65.2 |
| 6,724,165 | B1 * | 4/2004 | Hughes | 318/376 |
| 6,724,300 | B1 * | 4/2004 | Miyakoshi et al. | 340/435 |
| 6,742,487 | B1 * | 6/2004 | Yamaguchi et al. | 123/179.3 |
| 6,809,429 | B1 * | 10/2004 | Frank | 290/40 C |
| 6,895,917 | B1 * | 5/2005 | Itoh et al. | 123/179.4 |
| 6,898,506 | B1 * | 5/2005 | Kawai et al. | 701/84 |
| 6,900,552 | B1 * | 5/2005 | Fukano et al. | 290/40 C |
| 6,915,782 | B1 * | 7/2005 | Hanada et al. | 123/399 |
| 6,930,405 | B1 * | 8/2005 | Gunji | 290/40 C |
| 6,932,738 | B1 * | 8/2005 | Aoki et al. | 477/5 |
| 6,934,610 | B1 * | 8/2005 | Wakashiro et al. | 701/22 |
| 6,941,198 | B1 * | 9/2005 | Brigham et al. | 701/22 |
| 6,943,460 | B1 * | 9/2005 | Wakashiro et al. | 290/40 C |
| 2002/0052677 | A1 | 5/2002 | Lasson et al. | 701/22 |
| 2002/0055411 | A1 | 5/2002 | Yoshiaki et al. | 477/107 |
| 2002/0065165 | A1 | 5/2002 | Lasson et al. | 477/3 |

FOREIGN PATENT DOCUMENTS

| | | |
|---|---|---|
| EP | 0 543 390 B1 | 5/1993 |
| EP | 1 127 733 B1 | 8/2001 |
| EP | 1 211 117 A1 | 6/2002 |
| WO | WO 01/51870 | 7/2001 |
| WO | WO 01/65100 A2 | 9/2001 |

* cited by examiner

METHODS OF OPERATING A PARALLEL HYBRID VEHICLE HAVING AN INTERNAL COMBUSTION ENGINE AND A SECONDARY POWER SOURCE

BACKGROUND OF THE INVENTION

1. Field of the Invention

The present invention relates generally to methods for operating a hybrid vehicle and, more specifically, to methods for maximizing fuel efficiency while minimizing disruptions in drivability.

2. Description of the Related Art

Most vehicles employ conventional powertrain systems, which rely upon internal combustion engines (ICEs) as the sole source of power. Such systems are powered by fuel energy and, on average, achieve a thermal efficiency of 10–15%, while the remaining 85–90% of the fuel energy is wasted as heat. These heat losses are, in large part, due to the fact that ICEs can only produce energy and not reclaim it. Because conventional powertrain systems cannot recapture the vehicle's kinetic energy, frictional braking is used to slow or stop a vehicle, and in doing so, the vehicle's kinetic energy is converted to lost heat.

Hybrid powertrain systems can mitigate the foregoing efficiency losses. Although (like conventional powertrain systems) hybrid powertrain systems have an ICE powered by fuel energy, they (unlike conventional powertrain systems) also have a "secondary" powertrain system comprised of a two-way energy path capable of capturing the vehicle's kinetic energy during the braking process. Examples of secondary power sources capable of having a two-way energy path include, but are not limited to, electric and/or hydraulic motors. The energy used to power a hybrid's secondary power source ("secondary energy") depends on the type of secondary power source selected for use, and may consist of, for example, electric energy or hydraulic pressure. This energy is stored in an energy storage device, which receives and stores the vehicle's converted kinetic energy and allows for its reuse, when needed, to power the secondary power source.

When the ICE and the secondary power source of a hybrid vehicle each independently transmits power to the vehicle's wheels, the vehicle is commonly referred to as a parallel hybrid vehicle, and the wheels of the vehicle may be driven solely by the primary power source, solely by the secondary power source, or simultaneously by both. When the driver of such a vehicle makes a demand for power, the determination of which power source is used, and how it is used, greatly influences the vehicle's fuel economy. It also affects the "feel" the vehicle transmits to the driver ("drivability"). For example, when the vehicle is operated according to methods designed to maximize fuel efficiency, the secondary power source may cycle on and off too frequently, causing the drivability of the vehicle to suffer, resulting in a disruptive feel that may be commercially unacceptable to consumers. Conversely, when the vehicle is operated in a manner designed to maximize drivability, the secondary power source may not be used often enough, thereby resulting in a lower fuel economy than may be otherwise possible.

As a result, there is a need for a new and improved method of operating a parallel hybrid vehicle in a manner that strikes a balance between maximizing the vehicle's fuel efficiency while still providing the driver with an acceptable driving experience.

BRIEF SUMMARY OF THE INVENTION

The invention is directed toward methods for operating a parallel hybrid vehicle in a manner that responds to the operator's demand for power output, while maximizing engine efficiency and minimizing disruptions in vehicle drivability. According to principles of the present invention, when the driver of a hybrid vehicle makes a demand for power output immediately after a braking event, the power provided to meet the initial demand is from either an ICE or a secondary power source. Which power source is used, and when it is engaged and disengaged, depends on various vehicle operating conditions.

In one embodiment, a first unit of energy stored within an energy storage device is monitored and, if above a selected level, is used after each braking event to power a secondary power source and thereby propel the vehicle in response to the driver's demand for power output. As soon as this energy is reduced to a desired minimum level, the driver's demand for continued power is met by an ICE instead of the secondary power source. By first using the vehicle's secondary power source to propel the vehicle, and thus delaying the use of engine power until the vehicle is propelled to a vehicle speed that requires higher torque and/or engine speeds, the engine is more likely to operate within a higher efficiency range at the onset of its engagement. However, when the first unit of energy is not above a selected level, the secondary power source is not used. Instead, in response to the driver's demand for power, the driver's power output demand is met through ICE power alone. In a variation to this embodiment, the available energy is used after each braking event, regardless of whether the available energy is above a selected level. In such a scenario, although quicker transitions from the use of secondary power to ICE power may result, the use of engine power is still delayed, helping to achieve higher vehicle speeds before using the ICE.

In another embodiment, instead of using the vehicle's secondary power source to propel the vehicle after each braking event, the secondary power source is only used in situations where the preceding braking event suggests an intent to stop the vehicle (e.g., the braking reduces vehicle speed to five mph or less). When an intent to stop is suggested, the first unit of energy stored within the vehicle's energy storage device is used to power the secondary power source and thereby propel the vehicle. Once the first unit of energy is reduced to a desired minimum level, then power produced by the engine, instead of the power source, is used to continue meeting the driver's power demand. In this embodiment, when an intent to stop is not suggested, the secondary power source is not used. Instead, in response to the driver's demand for power, the driver's demands are met through ICE power output alone.

In yet another embodiment, when certain operating conditions are deemed to exist, the ICE is turned off during the duration of a braking event, and subsequently restarted. By turning the engine off during the duration of the braking event, additional fuel savings may be obtained. And, by subsequently restarting the engine according to the existence of other various operating conditions, disruptions in the drivability of a hybrid vehicle may be minimized. The conditions required for engine "on" and engine "off" are discussed further below.

Additionally, regardless of which embodiment is employed, in instances where the vehicle is driven by the ICE alone, a second unit of energy stored within the energy storage device may be used to power the secondary power source and thereby provide quick supplemental torque to the vehicle. This method is used to propel the vehicle when large increases in further power output demand cause the vehicle to downshift, resulting in momentary disruptions of ICE power delivered to the wheels. By using the ICE and the secondary power source simultaneously, for brief periods of time, the degradation in drivability caused by such momentary disruptions in ICE power can be reduced or eliminated.

BRIEF DESCRIPTION OF THE SEVERAL VIEWS OF THE DRAWING

FIGS. 5A, 5B, 5B1, 5B2, 5C–5E are logic flow diagrams for turning off an ICE during the operation of a hybrid vehicle.

DETAILED DESCRIPTION OF THE INVENTION

Figure 1:
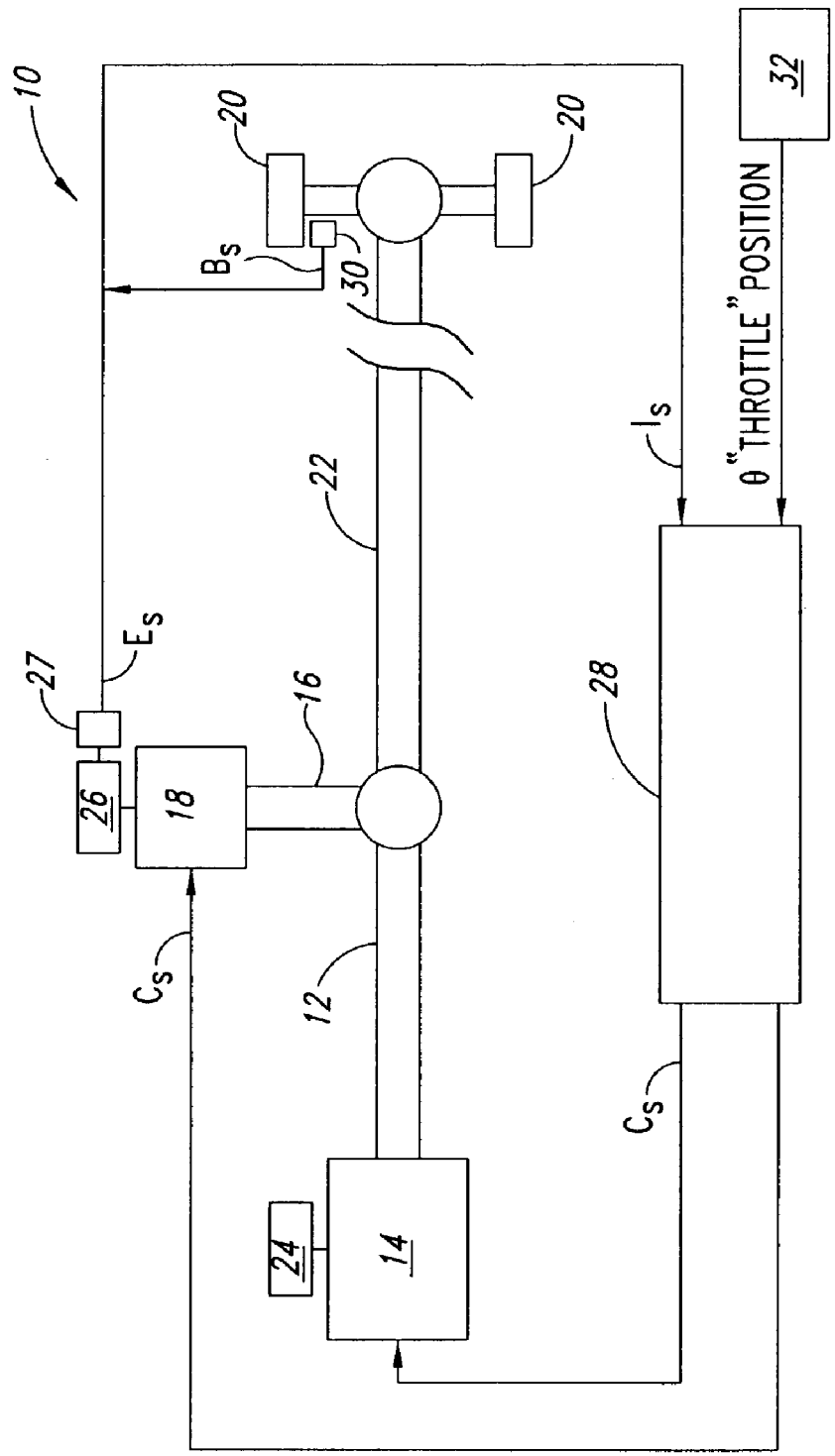
FIG. 1 is a schematic diagram of a parallel hybrid vehicle provided in accordance with the present invention.

In the following description, certain specific details are set forth in order to provide a thorough understanding of various embodiments of the invention. However, one of ordinary skill in the art will understand that the invention may be practiced without these details. In other instances, well-known structures associated with hybrid vehicles have not been shown or described in detail to avoid unnecessarily obscuring descriptions of the embodiments of the invention.

The term "secondary power source," as used herein, denotes a non-ICE power source capable of using energy captured during the vehicle's braking process. Thus, a secondary power source may include, for example, one or more electric or hydraulic motors. As is to be understood by one of ordinary skill in the art, other like systems may also be employed, and the secondary motors described herein do not limit the scope of the invention.

The term "secondary," as used herein, is arbitrarily assigned, and does not denote a percentage of use ranking. For example, although an ICE, in hybrid vehicle applications, is commonly referred to, by those of ordinary skill in the art, as a "primary" power source, the ICE of the present invention may be used to propel the vehicle for either a majority or a minority of the time. Likewise, the secondary power source of the present invention may be used to propel the vehicle for either a majority or a minority of the time.

Depending on the type of secondary power system selected for use, the energy used to power the secondary power source ("secondary energy") may consist of electric energy, hydraulic energy, or any other form of energy that can be, at least in part, obtained from the vehicle's kinetic energy during the braking process, and reused to power a secondary power source.

The term "energy storage device," as used herein, denotes a system capable of receiving and storing the secondary energy, and allowing for its reuse to power a secondary power source. Such a system may, for example, consist of electric batteries, mechanical flywheels or hydraulic accumulators. As is to be understood by one of ordinary skill in the art, other like systems may also be employed, and the systems described herein do not limit the scope of the invention.

The term "available energy," as used herein, refers to either (a) all of the energy in an energy storage device, less any minimal amount which may be necessary to maintain the functionality of the storage device, or (b) all of the energy stored in an energy storage device, less any minimal amount which may be necessary to maintain the functionality of the storage device, and less a predetermined reserve amount of "reserve energy" for providing supplemental torque/torque buffering.

The term "reserve energy," as used herein, refers to a specified amount of energy that may be reserved within an energy storage device to insure that a minimum amount of energy is available for the purpose of performing ancillary functions. Such other functions include, for example, powering the secondary power source to provide quick supplemental torque at times when the ICE is being used and large increases in further power output demand cause the vehicle to downshift, resulting in momentary disruptions of torque provided to the vehicle by the ICE. Determining how much energy should be reserved for this purpose is a design choice. Factors influencing this choice include the type of secondary power source selected for use, the type of energy stored within the energy storage device, the energy storage device's capacity and efficiency, the vehicle's weight, and fuel economy goals and vehicle performance objectives.

The headings provided herein are for convenience only and do not define or limit the scope or meaning of the claimed invention.

Applicability and General Overview

According to principles of the present invention, a CPU 28 processes input signals $I_s$ to determine when a parallel hybrid vehicle 10 will be powered by an ICE 14 alone, a secondary power source 18 alone, or the ICE 14 and the secondary power source 18 simultaneously. The CPU 28 of the present invention also processes input signals to determine when the ICE 14 may be shut off and subsequently restarted to further improve the vehicle fuel efficiency.

As shown in FIG. 1, the parallel hybrid vehicle 10 employs two drivetrains, with a first drivetrain 12 coupled to an ICE (primary power source) 14 and a second drivetrain 16 coupled to a secondary power source 18. In this way, the ICE 14 and the secondary power source 18 each independently transmit power to their respective drivetrains 12, 16, which power the vehicle's wheels 20. In the schematic shown in FIG. 1, drivetrains 12 and 16 are each coupled to a lower driveshaft 22, which in turn, is coupled to wheels 20, thus creating either a front wheel drive or a rear-wheel drive arrangement. As is to be understood by one of ordinary skill in the art, other configurations are also possible. For example, power transmitted from the ICE 14 to driveshaft 12 may be used to power the vehicle's front wheels, while power transmitted from the secondary power source 18 to driveshaft 16 may be used to power a vehicle's rear wheels, or vice versa.

Fuel energy stored in a vehicle fuel tank (not shown) is used to power the ICE. Coupled to the fuel tank and the ICE 14 is an engine control device 24 (such as, for example, a fuel injection pump), which controls fuel feed to the ICE 14. The type of energy used to power the secondary power source 18, depends on the type of secondary power source employed. Whether it is electrical, hydraulic or some other energy type, the secondary energy is stored within an energy storage device 26. Coupled to the energy storage device is a capacity sensor 27 for detecting the amount of energy within the energy storage device 26 at any given time, and generating a signal $E_s$ representative of the energy detected.

The hybrid vehicle 10 also has one or more microprocessors or computer processing units (CPUs) 28 for monitoring and performing various functions. While it is to be understood that all CPU functions described herein can be achieved with either a single or a number of CPUs, for convenience, the discussion below refers to just one CPU.

The CPU 28 of the present invention receives input signals $I_s$ from various sensors which monitor the operation and status of the vehicle's 10 various systems and subsystems. In accordance with the programmed logic of a particular vehicle's microprocessor, the CPU 28 processes received input signals, and in turn, sends appropriate command signals $C_s$ to operate the vehicle's various systems and subsystems.

Included among the many sensors (not all shown) which provide an input signal to the CPU 28 of the present invention, there are sensors which detect and monitor the speed, torque and acceleration of the vehicle, the speed and torque provided by the primary and secondary power sources, the driver's command to brake and cease braking the vehicle, the driver's command for power output, and the amount of available energy and reserve energy stored within the energy storage device 26. The CPU of the present invention also includes a memory for storing various lookup tables.

There are many types of commercially available sensors for monitoring the operating conditions of a vehicle's many systems and subsystems, and many types of commercially available microprocessing units for receiving and processing input signals ($I_s$), and generating command signals ($C_s$), which are known to those of ordinary skill in the art. Thus specific types will not be described in detail herein.

Determining Which Power Source to Use Following a Braking Command

In one embodiment, after each braking event (i.e., when the system senses a command to terminate braking), and in response to the driver's demand for power output, available energy stored within the vehicle's energy storage device 26 is used to power the secondary power source 18 and thereby propel the vehicle 10 only if the available energy is above a first selected level. By ensuring that the available energy is above a first selected level, this embodiment utilizes the secondary power source in instances when the driver is less likely to experience rapid transitions from one power source to another and thus reduces drivability issues. As will be understood by one of ordinary skill in the art, selecting this threshold level is a design choice and may be, for example, a level that ensures that the available energy is sufficient enough to propel the vehicle at a given speed for a certain amount of time, or sufficient enough to provide a minimum amount of torque.

Once the secondary power source is used to meet a driver's demand for power output after a braking event, the secondary power source continues to meet the driver's demand for power output until the available energy is reduced to a desired minimum level (i.e., the available energy is depleted). As soon as the available energy is depleted, power produced by the ICE 14, instead of the secondary power source 18, is used to meet the driver's power demand. By first using the vehicle's secondary power source 18 to propel the vehicle 10, and thus delaying the use of engine power until the vehicle is operating at a speed that requires higher torque and/or speeds, the ICE 14 is more likely to operate within a higher efficiency range at the onset of its engagement.

The control logic for operating this embodiment is described with reference to FIG. 2, which shows the flow of control processing by microprocessor or CPU 28. At step 201, a determination is made in accordance with whether or not the vehicle's brakes are engaged. If the brakes are engaged (Y=yes), regenerative braking is used, step 202, to capture the vehicle's kinetic energy and convert it into a form that can be stored in the vehicle's energy storage device 26. Supplemental frictional braking may also be used, if needed, to respond to the driver's braking command. Regenerative braking, and the process of converting a vehicle's kinetic energy to stored energy within an energy storage device is known to those of ordinary skill in the art, and is not detailed herein.

At step 203, a determination is made as to whether or not power is demanded by the driver. As will be understood by those of ordinary skill in the art, a number of means may be used to determine whether the driver makes a demand for power output. These means include, but are not limited to, the use of a throttle sensor, a fuel take-up sensor and/oran accelerator pedal position sensor. In one embodiment, a signal from a throttle sensor 32 indicates whether a driver demanded power.

If power is demanded, the CPU 28 proceeds to step 204, wherein a determination is made as to whether or not the available energy is above a selected level. This determination is made by first calculating the vehicle's 10 available energy. One way of determining available energy is to use capacity sensor 27 to measure the total energy stored in the energy storage device 26, and have the CPU 28 subtract from this value one or more preprogrammed values. While these values may be keyed to any selected criteria, in one embodiment, the values are representative of any minimal amount necessary to maintain the functionality of the storage device 26 and/or any predetermined reserve amount for providing supplemental torque. Once the available energy is determined, the CPU 28 may simply compare the available energy to the selected value stored in the CPU's 28 memory to determine whether the available energy is above the selected level.

If, in step 204, a determination is made that the available energy is not above the selected level, the CPU 28 issues a command, step 205, to meet the driver's demand for power with power generated by the ICE 14. The control processing unit next proceeds to step 206 to determine whether the driver has made a demand to slow or stop the vehicle. If such a demand has been made, the control processing unit returns to the "start" position.

However, if, in step 204, a determination is made that the available energy is above a selected level, the CPU 28 issues a command, step 207, to meet the driver's demand for power with power generated by the secondary power source 18. The control processing unit next proceeds to step 208 where a determination is made as to whether the driver has made a demand to slow or stop the vehicle. If such a demand has been made, the control processing unit returns to the "start" position.

However, if, in step 208, a demand has not been made to slow or stop the vehicle, the control processing unit proceeds to step 209, wherein a determination is made as to whether or not the available energy stored in the vehicle's storage device 26 is below a desired minimum level. As with determining whether the available energy is above a selected level in step 204, step 209 may be determined by comparing the available energy to a predetermined minimum value stored in the CPU's 28 memory to ascertain whether the available energy is below a desired minimum level.

Although the selection of the predetermined minimum value is a design choice, it is recommended to be a value that is either equal to or marginally greater than the sum of the minimal amount necessary to maintain the functionality of the storage device 26 and any predetermined reserve amount. In this way, either all, or nearly all, of the available energy will be used by the secondary power source 18.

In step 209, if the available energy is not below the desired minimum level, the CPU 28 issues a command to continue meeting the driver's demand for power with power generated by the secondary power source 18. If, however, the available energy is below the desired minimum level, the CPU 28 will then issue a command, step 210, to switch power sources and thereby meet the driver's power demand with power generated from the ICE 14 instead. The ICE 14 will continue to meet the driver's power demand until the driver issues his or her next command to brake the vehicle. At step 211, as soon as a command to brake is issued, the control processing returns to the "start" position.

In a variation to this embodiment, the available energy is used after each braking event, regardless of whether the available energy is above a selected level. In such a scenario, although quicker transitions from the use of secondary power to ICE power may result, the use of engine power will still be delayed, helping to achieve higher vehicle speeds before using the ICE.

In another embodiment, instead of using the vehicle's secondary power source 18 to propel the vehicle 10 after each braking event, the secondary power source 18 is only used in situations where the preceding braking event suggests an intent to stop the vehicle (e.g., the braking reduces vehicle speed to five mph or less, as discussed in greater detail below). When an intent to stop is suggested, available energy stored within the vehicle's energy storage device 26 is used to power the secondary power source 18 and propel the vehicle 10. As soon as the available energy is reduced below a selected minimum level, then power produced by the ICE 14, instead of the secondary power source 18, is used to continue meeting the driver's power demand. When an intent to stop is not suggested, the secondary power source 18 is not used. Instead, in response to the driver's demand for power, the driver's demands are met through ICE power output alone.

In this embodiment, by only using the secondary power source when an "intent to stop" is indicated, there is a greater likelihood that the braking which just took place was great enough to generate, through the regenerative braking process, enough available energy to avoid or minimize instances where the secondary power source is on for only a short spurt before the available energy is reduced below the desired minimum level. Thus, this embodiment also minimizes rapid transitions from one power source to another, and offers improved drivability.

The control logic for operating this "intent to stop" embodiment is described with reference to FIG. 3, which shows the control processing by microprocessor or CPU 28. At step 301, a determination is made in accordance with a signal from brake sensor 30 as to whether or not the vehicle's brakes are engaged. If the brakes are engaged, the CPU 28 sends a signal, step 302, to brake the vehicle. As with the previous embodiment, regenerative braking is used to capture the vehicle's kinetic energy. Frictional braking may also be used. If the brakes are no longer engaged, the CPU 28 proceeds to step 303 wherein a determination is made, as with throttle sensor 32 for example, as to whether or not power is demanded by the driver. If power is demanded, the CPU 28 proceeds to step 304, wherein a determination is made as to whether or not the command to brake the vehicle in step 301 indicated an intent to stop the vehicle.

In determining the "intent to stop" criterion in step 304, the CPU 28 compares the lowest speed achieved in step 301 to a pre-programmed value selected to indicate a driver's intent to stop. While determining a driver's intent to stop may be determined in several different ways, in one embodiment, an intent to stop the vehicle is assumed when the vehicle speed falls below a selected level. While this threshold speed may be set at any point, in one embodiment, it is set at 5 mph, such that an intent to stop is registered by the system when the vehicle speed falls equal to or below 5 mph. When vehicle speed is reduced a level that indicates an intent to stop the vehicle step 301, the regenerative braking function which follows (step 302), increases the likelihood that the available energy stored in the energy storage device 26 will be enough to power the vehicle 10 with the secondary power source 18 for an adequately long enough period of time to minimize or avoid drivability issues.

As a result, in step 304, if a determination is made that there was no intent to stop the vehicle in step 301, it is presumed that the available energy stored in the energy storage device 26 is not enough to smoothly power the vehicle with the secondary power source, and as a result, the CPU 28 issues a command, step 305, to drive the vehicle with ICE power 14. In such a scenario, the ICE 14 continues to power the vehicle until the driver issues a command to brake the vehicle. If a command to brake the vehicle is issued (step 306) then the control processing returns to the "start" position.

If, in step 304, however, it is determined that there was an intent to stop the vehicle in step 301, then the vehicle is powered by the secondary power source 18, step 307, until either the driver issues a command to brake the vehicle (step 308), in which case the control processing returns to the "start" position, or, it is determined that the available energy is below the desired minimum level (step 309), in which case the CPU 28 issues a command, step 310, to meet the driver's demand for power with power generated by the ICE 14. If, in step 309, a determination is made to drive the vehicle 10 with ICE power, the ICE 14 continues to meet the driver's power demand, step 310, until the next braking event, step 311, and the control processing returns to the "start" position.

In yet another embodiment, if any one of the two operating conditions listed below are met, then the secondary power source 18 is used to first propel the vehicle after a braking event, and its use is continued until the available energy within the energy storage device 26 is reduced below a desired minimum level. As soon as the available energy is below this level, power produced by the ICE 14, instead of the secondary power source 18, is used to continue meeting the driver's demand for power. However, if neither of the two operating conditions listed below are met, then the secondary power source 18 is not used and, instead, the vehicle is powered by the ICE 14. These conditions are:

(a) if the braking event suggests an intent to stop the vehicle; or (b) if after a braking event, the available energy is sufficient enough to provide a minimum desired level of vehicle torque (for example, in cases where secondary energy is stored in an accumulator, the pressure within the accumulator exceeds a selected level).

This embodiment is similar to the "intent to stop" embodiment, but also adds criterion (b), above, to help determine whether the available energy stored in the energy storage device 26 is likely to be enough to avoid short spurts of secondary power source use.

The control logic for operating this embodiment is described with reference to FIG. 4, which shows the flow control processing by microprocessor or CPU 28. In this embodiment, a determination is made, at step 401, in accordance with a signal from brake sensor 30, as to whether or not the vehicle's brakes are engaged. If the brakes are engaged, regenerative braking is used (step 402). If additional braking is needed to meet the driver's braking demand, frictional braking may also be used.

At step 403, a determination is made, as for example, through use of throttle sensor 32, as to whether or not power is demanded by the driver. If power is demanded, the CPU 28 proceeds to step 404, wherein a determination is made as to whether the command to brake the vehicle in step 401 indicated an intent to stop the vehicle. If so, the vehicle is driven by the secondary power source (step 408). If not, the CPU 28 proceeds to step 405, wherein a determination is made as to whether the available energy is sufficient to provide a minimum desired level of torque. This determination can be made by reference to a look-up table stored in the memory of the CPU 28. For instance, the capacity sensor 27 may send a signal $E_s$ to the CPU 28, and based on preprogrammed values for the minimum amount of energy needed to maintain functionality of the storage device and preprogrammed values for any desired amount of reserve energy, if any, the CPU may calculate the available energy stored in the vehicle's energy storage system 26. The available energy may then be compared to a table of stored values within the memory of CPU 28 which correlate to the amount of torque for a given vehicle speed that may be generated by the vehicle's available energy, and compared to a preprogrammed minimum desired level of torque to determine if the criterion in step 405 is met.

The pre-programmed minimum desired level of torque is a design choice selected according to driveability versus fuel economy goals. The lower the value, the more likely it is that the secondary power source 18 will be employed to power the vehicle 10, thus tending to increase fuel efficiency. However, if the minimum desired level of torque is set too low, it is also more likely that the secondary power source 18 will be used for only a short duration of time, thus tending to increase driveability issues.

If step 404 indicates that there was no intent to stop the vehicle in step 401 and, the available energy in step 405 is not sufficient enough to provide a minimum level of torque, then the vehicle is driven with power generated by the ICE 14 (step 406), and the CPU 28 proceeds to step 407, where a determination is made as to whether or not there is still a driver's demand for continued power. If the driver does not issue a command to brake the vehicle in step 407, the ICE 14 continues to drive the vehicle 10. As soon as the driver issues a command to brake, however, the control processing returns to the "start" position.

If, however, step 404 indicates that there was an intent to stop the vehicle in step 401, or step 405 determines that the available energy is sufficient enough to provide a minimum level of torque, then the vehicle is driven with power generated by the secondary power source 18 (step 408), until either the driver issues a command to brake the vehicle, step 409, or the CPU 28 determines, in step 410, that the available energy is below the desired minimum level. If, in step 410, the available energy is reduced below the desired minimum level, then the driver's demand for continued power is met with power generated by the ICE 14, step 411, until the next braking event (step 412), at which time, the control processing unit returns to the "start" position.

Summary of Which Power Source is Used Following a Braking Command

Thus, summarized below are the various embodiments in which available energy may be used to power the secondary power source 18 and thereby initially propel the vehicle 10 following a braking event.

Figure 2:
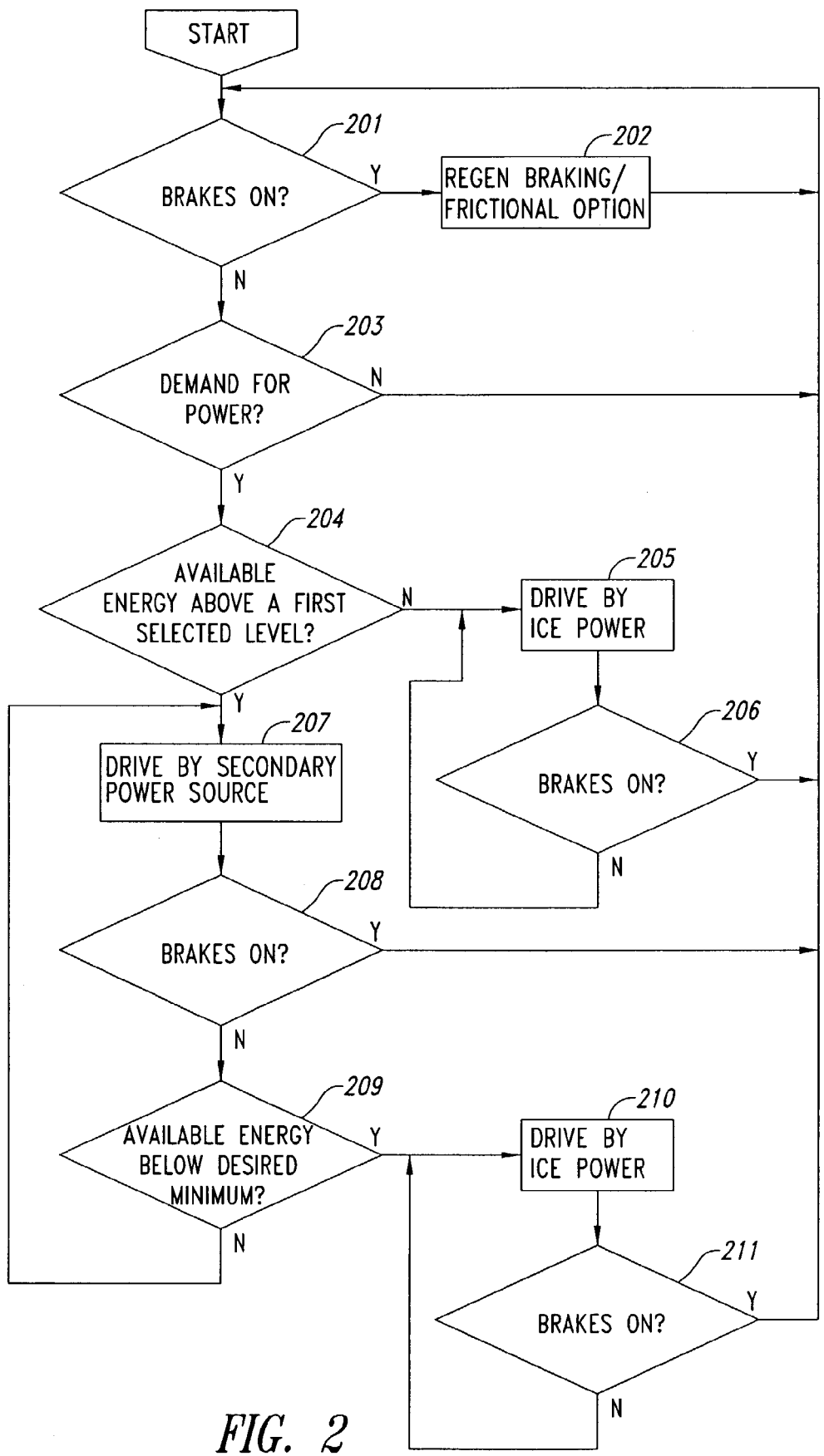
FIG. 2 is a logic flow diagram for control of operation of a hybrid vehicle by a microprocessor in accordance with one embodiment of the present invention.

(1) As illustrated in FIG. 2, available energy is used after each braking event, and when reduced below a desired minimum level, the secondary power source 18 is no longer used to propel the vehicle. Instead, the ICE 14 is used to meet the driver's continued power demands.

Figure 3:
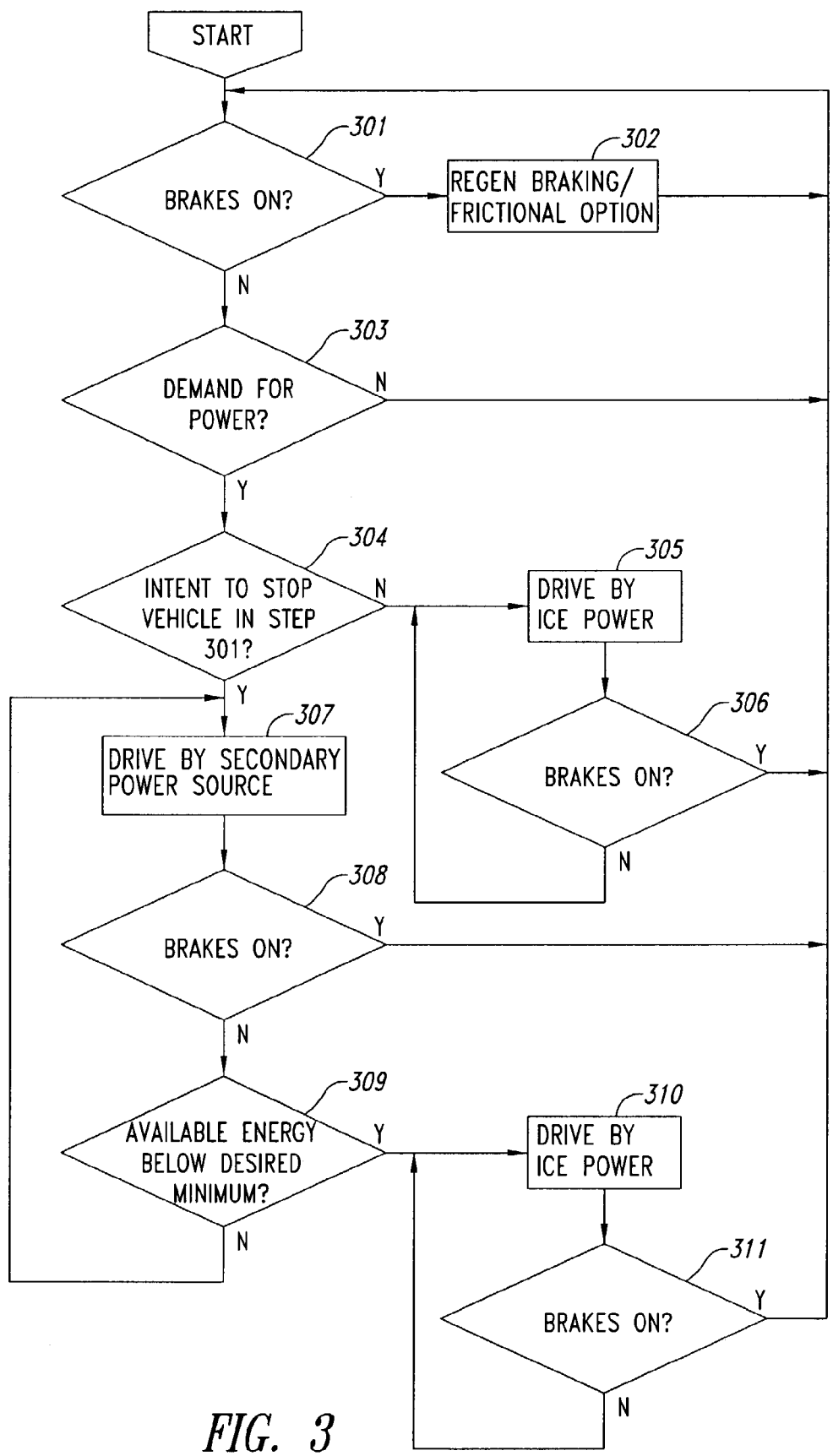
FIG. 3 is a logic flow diagram for control of operation of a hybrid vehicle by a microprocessor in accordance with another embodiment of the present invention.

(2) As illustrated in FIG. 3, available energy is used after those braking events which indicate an intent to stop the vehicle (e.g., 5 mph or less), and if no such intent is indicated then the secondary power source 18 is not used. Instead, the ICE 14 is used to propel the vehicle.

Figure 4:
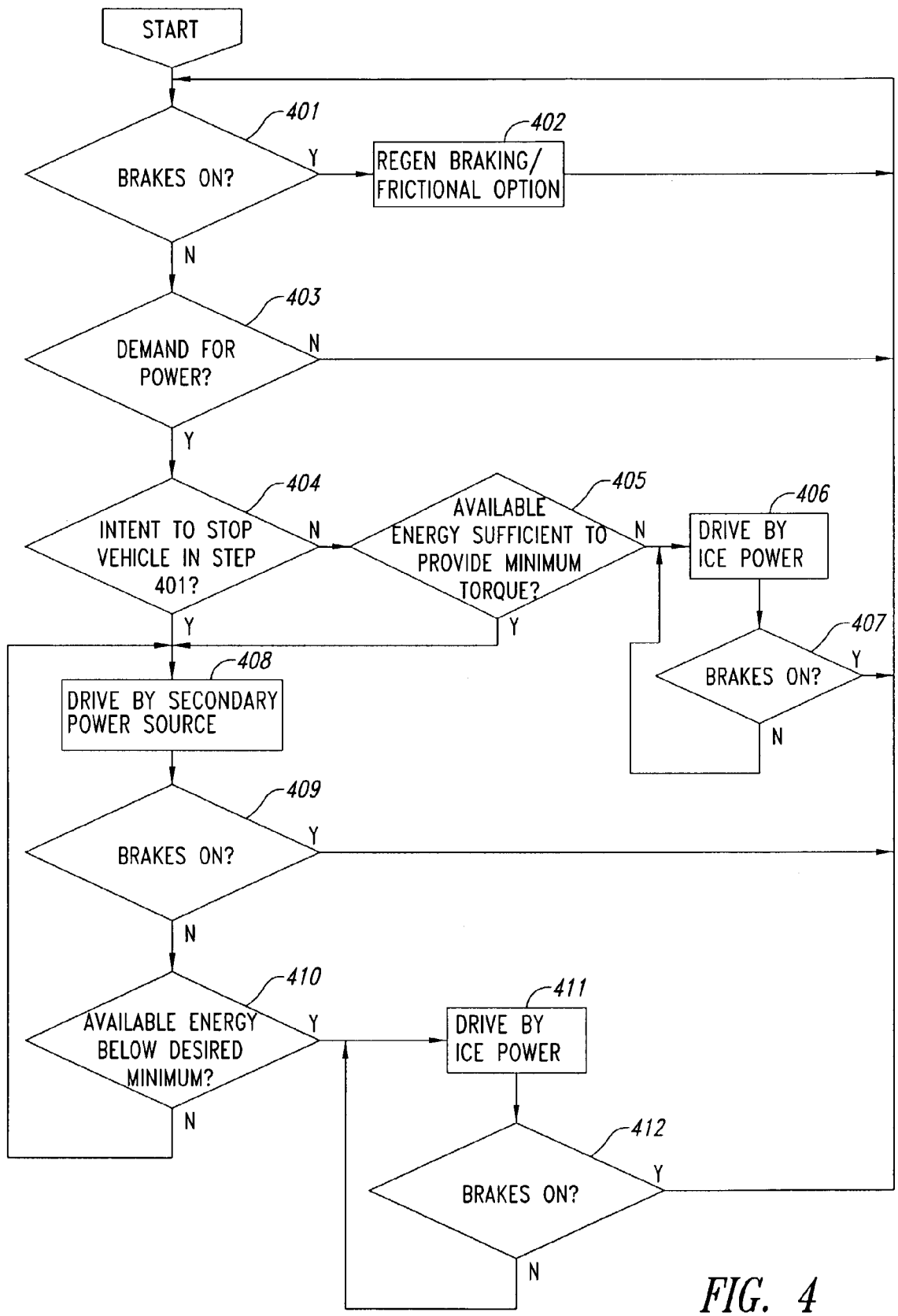
FIG. 4 is a logic flow diagram for control of operation of a hybrid vehicle by a microprocessor in accordance with yet another embodiment of the present invention.

(3) As illustrated in FIG. 4, available energy is used after those braking events which indicate an intent to stop the vehicle (e.g., 5 mph or less) and if no such intent is indicated, available energy is still used if, after a braking event, the available energy is sufficient enough to provide a minimum desired level of torque. In this embodiment, when neither of these two conditions exists, the secondary power source 18 is not used. Instead, the ICE 14 is used to propel the vehicle.

According to principles of the present invention, each of the above embodiments may be employed with the ICE 14 on and idling during the duration of each braking event, or, alternatively, with the ICE 14 off. If the amount of time that the vehicle operates with the ICE off is maximized, greater fuel economy benefits will result. However, frequent and abrupt ICE shutdowns may lead to drivability and customer acceptability problems. Thus, when the goal is to maximize the vehicle's drivability, the ICE 14 is always on and idling for each of the embodiments described above. When the goal is to maximize fuel economy and simultaneously minimize drivability concerns, the vehicle's operating conditions are monitored and a decision is made as to whether the ICE remains on during the duration of each braking event, or is turned off, depending on the presence or absence of certain conditions, as described below. Thus, determining when to turn the ICE 14 off, and subsequently restart it, is yet another advantage provided by the present invention.

Determining Whether to Turn Off the ICE

Figure 5A:
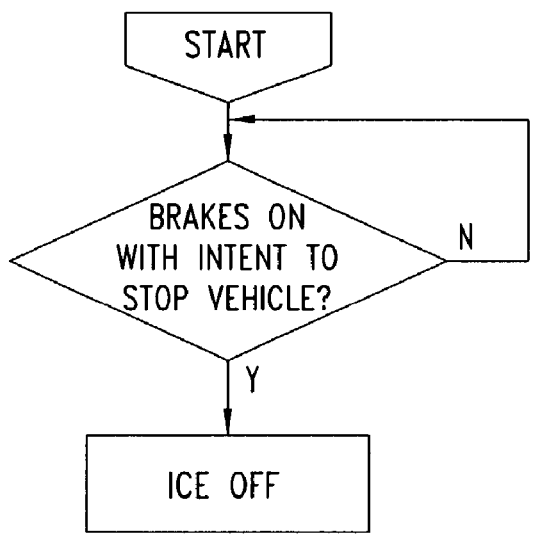
Figure 5B:
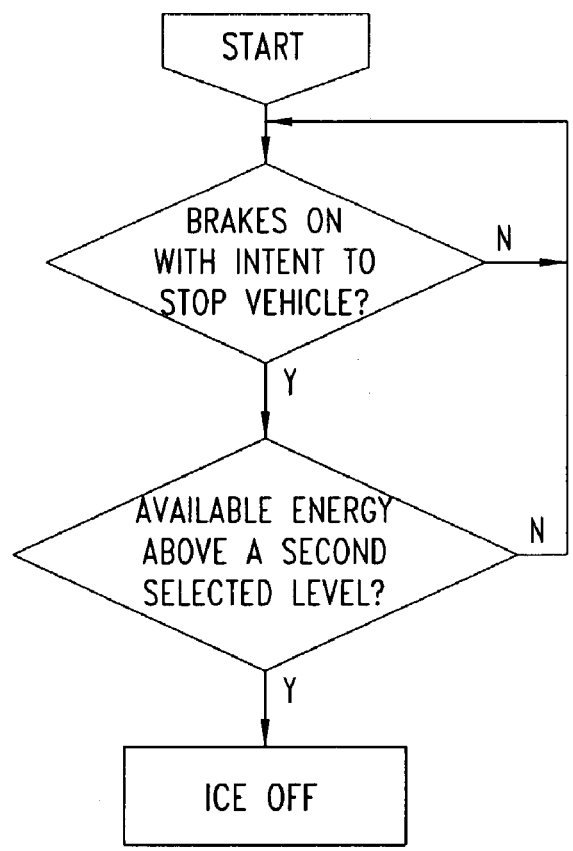
Figures 1, 5B:
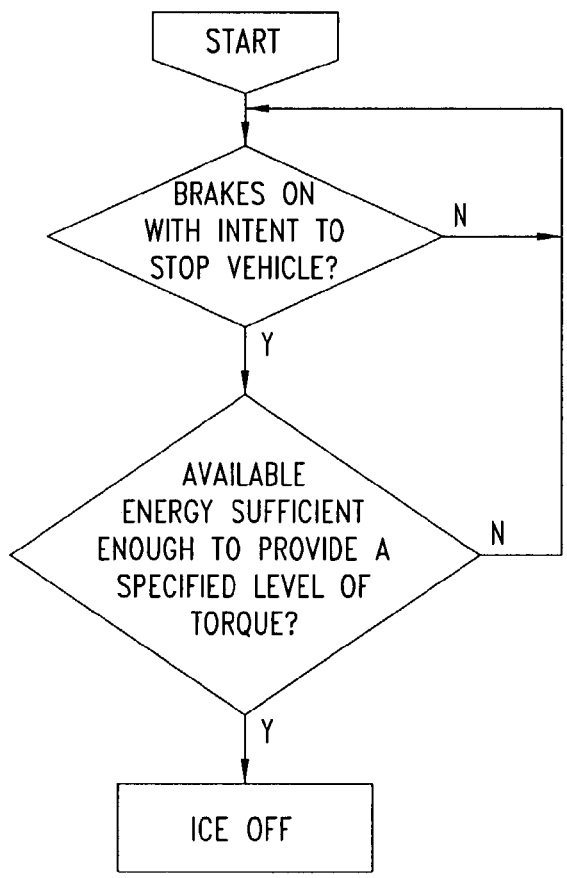
Figures 2, 5B:
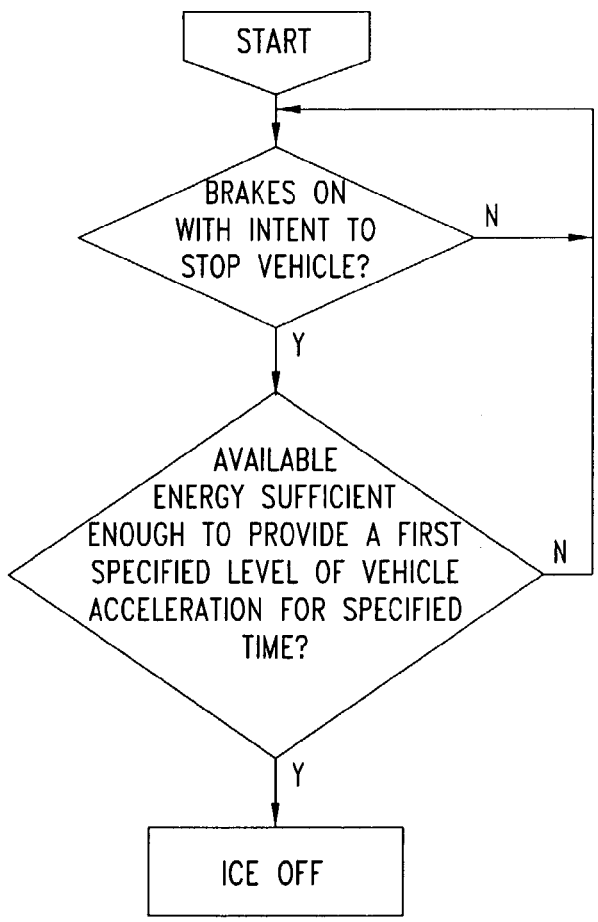

In one embodiment, the ICE 14 is turned off during the duration of a braking event when either (a) or (b), or both (a) and (b), of the following conditions exist:

(a) the braking event indicates an intent to stop the vehicle (shown in FIG. 5A);

(b) the demand for power output terminates and the available energy to power the secondary power source is above a selected level. While various goals may be contemplated in selecting the threshold level, examples include having sufficient energy to provide a specified level of vehicle torque or specified level of vehicle acceleration for a specified amount of time (shown in FIG. 5B). Such as, for example:

(b)(1) the braking event indicates an intent to stop the vehicle and, the available energy is sufficient enough to provide the secondary power source 18 with a specified level of torque (for example, in cases where the secondary energy is stored in an accumulator, the pressure within the accumulator is at or above a certain pressure) (shown in FIG. 5B-1); or (b)(2) the braking event suggests an intent to stop the vehicle and, the available energy is sufficient enough to provide, through the secondary power source 18, a specified level of vehicle acceleration for a specified amount of time (shown in FIG. 5B-2).

Figure 5C:
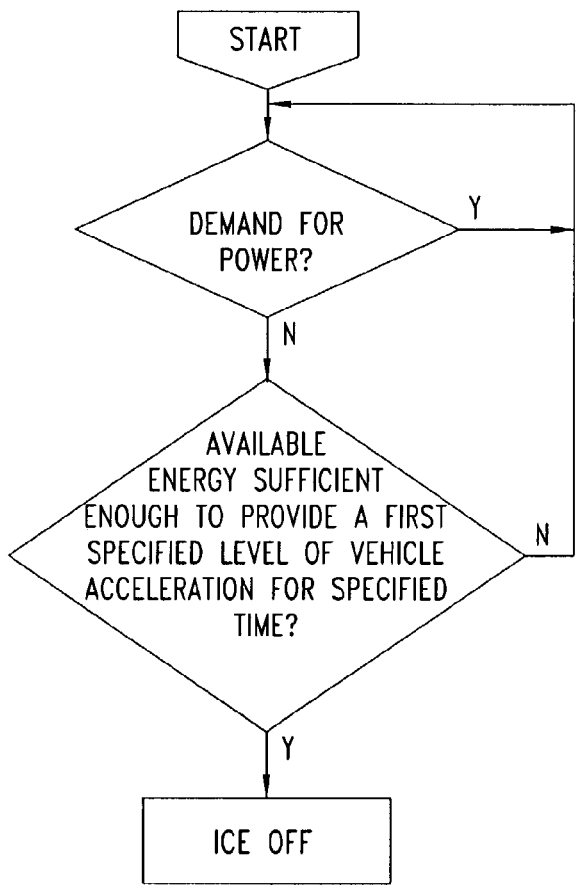
Figure 5D:
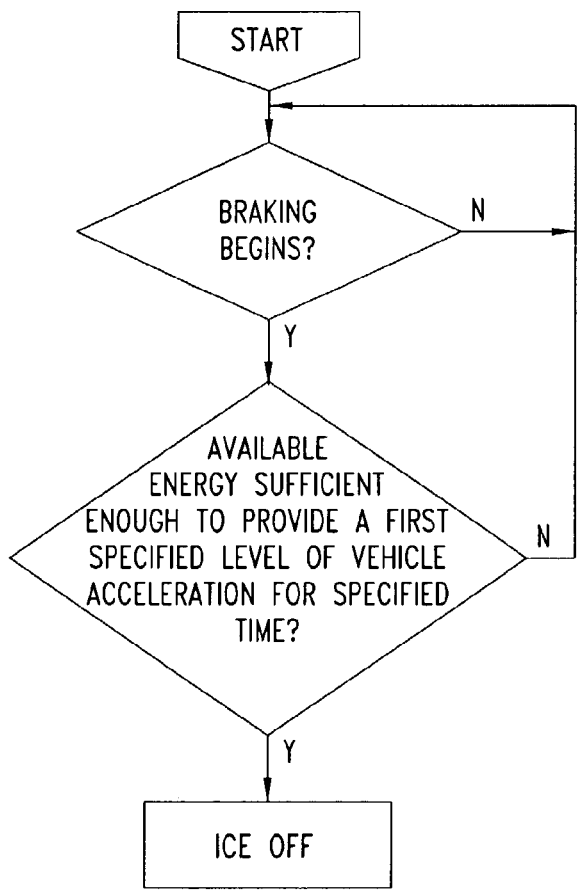
Figure 5E:
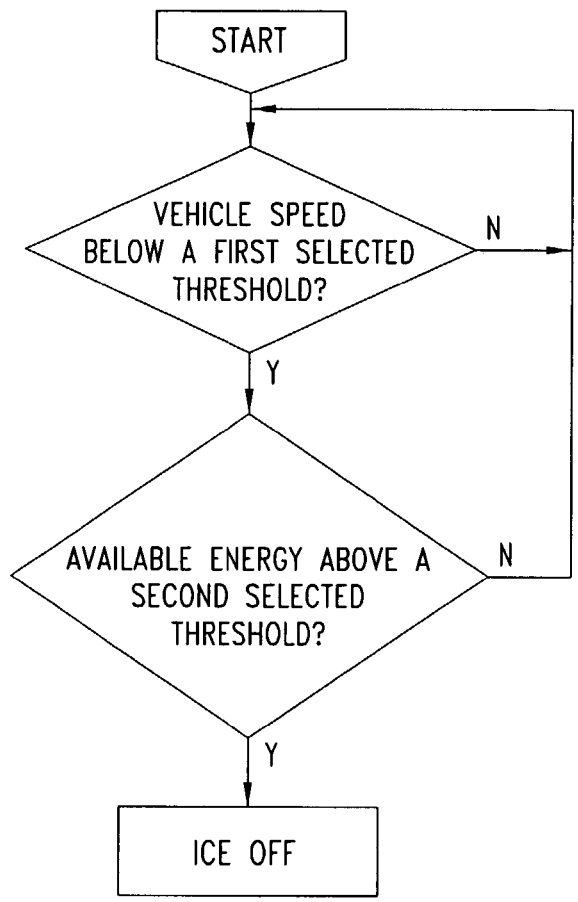

In another embodiment, when the available energy is sufficient enough to power the secondary power source 18 and thereby provide a specified level of vehicle acceleration for a specified amount of time, as in example "(b)(2)" above, rather than waiting for the time required to determine whether an intent to stop the vehicle is indicated, it may be desirable to turn the engine off sooner. Thus, instead of "(b)(2)" above, the ICE 14 may also be turned off as soon as:

(c) the driver's demand for power terminates and, the available energy is sufficient enough to provide, through the secondary power source 18, a specified level of vehicle acceleration for a specified amount of time (shown in FIG. 5C);

(d) the driver's demand for braking begins and, the available energy is sufficient enough to provide, through the secondary power source 18, a specified level of vehicle acceleration for a specified amount of time (shown in FIG. 5D); or (e) the vehicle speed falls below a first selected threshold and the available energy to power the secondary power source is above a second selected threshold (shown in FIG. 5E).

While the first threshold speed in condition "e" above may be set at any point, in one embodiment, the first selected threshold is about 60 mph, and more preferably about 45 mph. In one embodiment, the second selected threshold is set so that the available energy is sufficient enough to provide, through the secondary power source 18, a specified level of vehicle acceleration for a specified amount of time. In this example, by waiting until the vehicle speed is reduced from typical highway speeds below 60 mph prior to turning the ICE off, it is more likely that the driving "feel" provided by the secondary power source 18 immediately after the braking event will more closely resemble the driving "feel" provided by the ICE 14 immediately preceding the braking event. It is also more likely that the available energy will be enough to power the secondary power source 18 long enough to minimize quick transitions (once the available energy is depleted) from power source 18 to the ICE 14.

To determine whether the available energy stored in the vehicle's energy storage device 26 is sufficient enough to provide a specified level of acceleration for a specified amount of time, the available energy may be calculated in the manner described above, and compared to a lookup table of acceleration and time values for various vehicle speeds stored in the vehicle's CPU 28, and which correspond to various energy levels. Since vehicle acceleration is influenced by vehicle size, vehicle weight, the size and power rating of the secondary power source, the size and performance characteristics of the secondary energy storage device, etc., the values in this look up table will vary according to the particular vehicle system used.

As was explained above with respect to the selection of a preprogrammed minimum desired level of torque, the selection of a value representing a specified level of vehicle acceleration for a specified amount of time is also a design choice made according to the driveability versus fuel efficiency goals. For example, in conditions "c" through "e" above, if too low a threshold value is selected, there is an increased likelihood that the secondary power source 18 will be on for only a short duration, causing not only quick transition from power source 18 to the ICE 14, but also necessitating a quick engine off/engine on scenario, which will likely add to perceived driveability issues. Therefore, as an example, in one embodiment, it is desired that the minimum level of vehicle acceleration be about 5 mph per second, and that this level of acceleration be maintained for a minimum of about 3 seconds, providing sufficient time to restart the ICE 14.

Determining When to Turn Engine On if Previously Turned Off

Figure 6A:
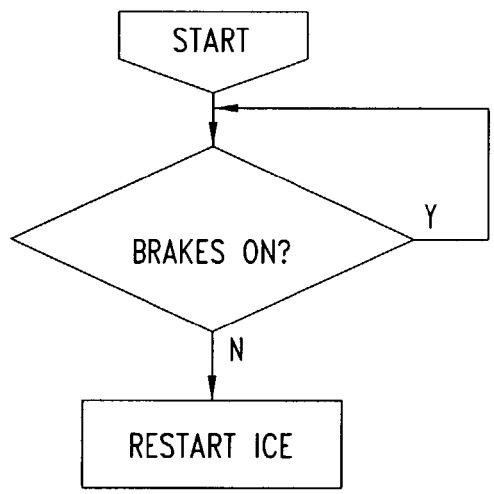
FIGS. 6A–6C are logic flow diagrams for turning on an ICE during the operation of a hybrid vehicle.

In one embodiment, designed to minimize the impact on drivability, the ICE 14 is restarted as soon as the braking command ceases to exist (shown in FIG. 6A). Thus, the ICE 14 idles in "ready mode" and is re-engaged as soon as it is needed.

Figure 6B:
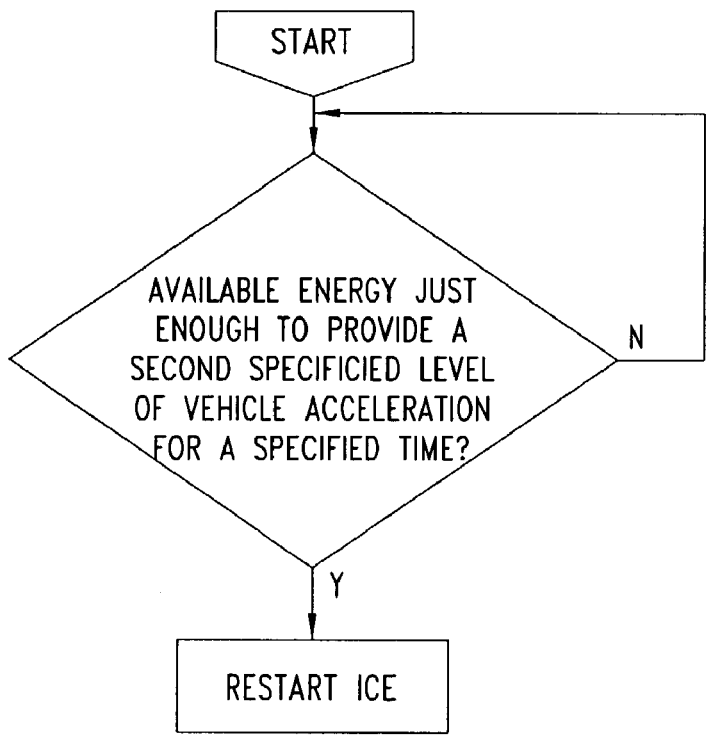

In another embodiment, designed to minimize the amount of time the ICE 14 is using fuel, the engine 14 is restarted when the available energy is just enough to provide a specified level of acceleration for a specified amount of time (shown in FIG. 6B).

Figure 6C:
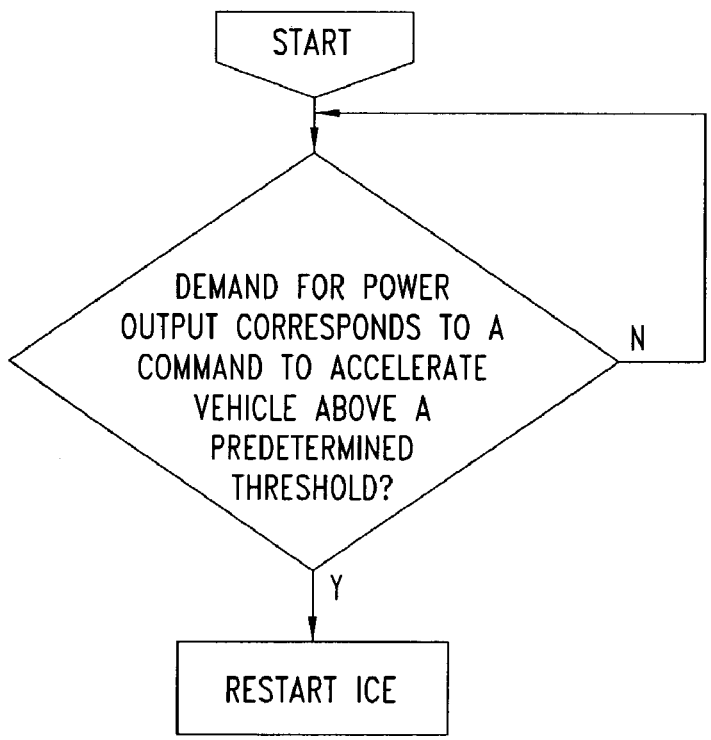

In yet another embodiment, also designed to minimize the amount of time the ICE 14 is using fuel, but to also give an engine restart response to the driver's command for high acceleration for improved driver "feel," the engine 14 is also restarted when the driver's command to accelerate the vehicle is above a predetermined acceleration command threshold (shown in FIG. 6C). This threshold value may be, for example, a predetermined acceleration value stored in the memory of the CPU 28.

Supplemental Torque/Torque Buffering

A further benefit of the present invention, applicable to each of the embodiments described above, is that a specified amount of energy may be reserved within the energy storage device 26 ("reserve energy") and used to power the secondary power source in order to provide quick supplemental torque at times when large increases in power output demand cause the engine to downshift to a higher revolution per minute ("rpm"), resulting in momentary disruptions of torque provided to the vehicle by the ICE. Thus, for short, intermittent periods of time, such as when accelerating to pass another vehicle, the ICE and the secondary power source may be used simultaneously to power the vehicle.

One way of determining whether a power output demand is likely to cause a downshift event includes determining when there has been a high acceleration demand. For example, when the driver's demand for power exceeds a selected level of vehicle acceleration. Although any level of acceleration may be selected, in one embodiment, the threshold is selected to be about 6 mph per second. As will be readily understood by one of ordinary skill in the art, several other means for determining or predicting a downshift event may also be employed, and the methods described herein do not limit the scope of the invention.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of operating a hybrid vehicle comprising:
  monitoring a braking event;

monitoring an amount of available energy stored within an energy storage device to power a secondary power source;

determining if the braking event indicates an intent to stop the vehicle;

turning an ICE off when the braking event indicates an intent to stop the vehicle and the available energy to power the secondary power source is above a second threshold;

detecting a demand for power output following the braking event;

utilizing the amount of available energy to initially power the secondary power source and thereby propel the vehicle in response to the demand for power output if the available energy is above a first threshold;

utilizing power provided by the ICE to continue meeting the demand for power output when the secondary power source is initially used and the amount of available energy is subsequently depleted; and utilizing power provided by the ICE, instead of the secondary power source, to propel the vehicle in response to the demand for power output when the available energy is not above the first threshold.

2. The method according to claim 1 further comprising: restarting the ICE as soon as a command to brake the vehicle ceases to exist.

3. The method according to claim 1 further comprising: restarting the ICE when the available energy is just enough to provide a specified level of acceleration to the vehicle, through the secondary power source, for a specified amount of time.

4. The method according to claim 1 further comprising: restarting the ICE when the demand for power output corresponds to a command to accelerate the vehicle above a predetermined acceleration rate.

5. The method according to claim 1 wherein the second threshold is sufficient to provide a first specified level of vehicle acceleration for a specified amount of time.

6. The method according to claim 5 further comprising: restarting the ICE when the available energy is just enough to provide a second specified level of acceleration to the vehicle, through the secondary power source, for a specified amount of time.

7. The method according to claim 1 further comprising: turning the ICE off when the demand for power output terminates and the available energy to power the secondary power source is sufficient to provide a first specified level of vehicle acceleration for a specified amount of time.

8. The method according to claim 7 further comprising: restarting the ICE when the available energy is just enough to provide a second specified level of acceleration to the vehicle, through the secondary power source, for a specified amount of time.

9. The method according to claim 7 further comprising: restarting the ICE when the demand for power output corresponds to a command to accelerate the vehicle above a predetermined acceleration rate.

10. The method according to claim 1 further comprising: monitoring the amount of available energy; and comparing the amount of available energy to a table of pre-established torque and pre-established acceleration values to determine whether the amount of available energy is sufficient to provide a specified level of vehicle torque, or sufficient to provide a specified level of vehicle acceleration for a specified amount of time.

11. The method according to claim 10 wherein the amount of available energy is a unit of electric energy.

12. The method according to claim 10 wherein the amount of available energy is a unit of hydraulic pressure.

13. A method of operating a hybrid vehicle having primary and secondary power sources comprising:

utilizing power provided by the primary power source to propel the vehicle;

monitoring an amount of reserve energy stored within the energy storage device;

determining when a demand for additional power output will result in a transmission downshift event; and utilizing the amount of reserve energy to power the secondary power source and provide supplemental power to the primary power source in order to reduce or eliminate momentary disruptions in power that would otherwise occur during the downshift event.

14. The method according to claim 13 further comprising powering the vehicle by both the primary and secondary power sources until the demand for additional ICE power output is terminated or the amount of reserve energy is depleted.

15. A method of operating a hybrid vehicle comprising:

monitoring a braking event;

determining if the braking event indicates an intent to stop the vehicle;

monitoring an amount of available energy stored within an energy storage device to power a secondary power source;

detecting a demand for power output following the braking event;

utilizing the amount of available energy to initially power the secondary power source and thereby propel the vehicle in response to the demand for power output if the braking event indicates an intent to stop the vehicle;

utilizing power provided by an ICE to continue meeting the demand for power output when the secondary power source is initially used and the amount of available energy is subsequently depleted; and utilizing power provided by the ICE, instead of the secondary power source, to propel the vehicle in response to the demand for power output when the braking event does not indicate an intent to stop the vehicle.

16. The method according to claim 15 further comprising: turning the ICE off when the braking event indicates an intent to stop the vehicle and the available energy to power the secondary power source is above a selected level.

17. The method according to claim 16 further comprising: restarting the ICE as soon as a command to brake the vehicle ceases to exist.

18. The method according to claim 16 further comprising: restarting the ICE when the available energy is just enough to provide a specified level of acceleration to the vehicle, through the secondary power source, for a specified amount of time.

19. The method according to claim 16 further comprising: restarting the ICE when the demand for power output corresponds to a command to accelerate the vehicle above a predetermined acceleration rate.

20. The method according to claim 16 further comprising: turning the ICE off when the braking event indicates an intent to stop the vehicle and the available energy to power the secondary power source is sufficient enough to provide a first specified level of vehicle acceleration for a specified amount of time.

21. The method according to claim 20 further comprising:
restarting the ICE when the available energy is just enough to provide a second specified level of acceleration to the vehicle, through the secondary power source, for a specified amount of time.

22. The method according to claim 15 further comprising:
turning the ICE off when the demand for power output terminates and the available energy to power the secondary power source is sufficient to provide a first specified level of vehicle acceleration for a specified amount of time.

23. The method according to claim 22 further comprising:
restarting the ICE when the available energy is just enough to provide a second specified level of acceleration to the vehicle, through the secondary power source, for a specified amount of time.

24. The method according to claim 22 further comprising:
restarting the ICE when the demand for power output corresponds to a command to accelerate the vehicle above a predetermined acceleration rate.

25. The method according to claim 15 further comprising:
turning the ICE off when a command for braking begins if the available energy to power the secondary power source is sufficient enough to provide a first specified level of vehicle acceleration for a specified amount of time.

26. The method according to claim 26 further comprising:
restarting the ICE when the available energy is just enough to provide a second specified level of acceleration to the vehicle, through the secondary power source, for a specified amount of time.

27. The method according to claim 25 further comprising:
restarting the ICE when the demand for power output corresponds to a command to accelerate the vehicle above a predetermined acceleration rate.

28. The method according to claim 15 further comprising:
turning the ICE off when the vehicle's speed falls below a first selected threshold and the available energy to power the secondary power source is above a second selected threshold.

29. The method according to claim 28 further comprising:
restarting the ICE when the available energy is just enough to provide a specified level of acceleration to the vehicle, through the secondary power source, for a specified amount of time.

30. The method according to claim 28 further comprising:
restarting the ICE when the demand for power output corresponds to a command to accelerate the vehicle above a predetermined acceleration rate.

31. The method according to claim 15 further comprising:
monitoring the amount of available energy; and
comparing the amount of available energy to a table of pre-established torque and pre-established acceleration values to determine whether the amount of available energy is sufficient to provide a specified level of vehicle torque, or sufficient to provide a specified level of vehicle acceleration for a specified amount of time.

32. The method according to claim 31 wherein the amount of available energy is a unit of electric energy.

33. The method according to claim 31 wherein the amount of available energy is a unit of hydraulic pressure.

34. The method according to claim 15 further comprising:
monitoring an amount of reserve energy stored within the energy storage device;
determining when a demand for additional ICE power output will result in a transmission downshift event; and
utilizing the amount of reserve energy to power the secondary power source and provide supplemental power to the vehicle, the vehicle thereby being powered by both the ICE and the secondary power source until the demand for additional ICE power output is terminated or the amount of reserve energy is depleted.

35. A method of operating a hybrid vehicle comprising:
monitoring a braking event;
monitoring an amount of available energy stored within an energy storage device to power a secondary power source;
detecting a demand for power output following the braking event;
determining if the braking event indicates an intent to stop the vehicle;
utilizing the amount of available energy to initially power the secondary power source and thereby propel the vehicle in response to the demand for power output when the braking event indicates an intent to stop the vehicle;
utilizing the amount of available energy to initially power the secondary power source and thereby propel the vehicle in response to the demand for power output when the amount of available energy is sufficient to provide a minimum desired level of vehicle torque;
utilizing power provided by an ICE to continue meeting the demand for power output when the secondary power source is initially used and the amount of available energy is subsequently depleted; and
utilizing power provided by the ICE to propel the vehicle in response to the demand for power output when the braking event does not indicate an intent to stop the vehicle and the amount of available energy is not sufficient to provide the minimum desired level of vehicle torque.

36. The method according to claim 35 further comprising:
turning the ICE off when the braking event indicates an intent to stop the vehicle and the available energy to power the secondary power source is above a selected level.

37. The method according to claim 36 further comprising:
restarting the ICE as soon as a command to brake the vehicle ceases to exist.

38. The method according to claim 36 further comprising:
restarting the ICE when the available energy is just enough to provide a specified level of acceleration to the vehicle, through the secondary power source, for a specified amount of time.

39. The method according to claim 36 further comprising:
restarting the ICE when the demand for power output corresponds to a command to accelerate the vehicle above a predetermined acceleration rate.

40. The method according to claim 36 further comprising:
turning the ICE off when the braking event indicates an intent to stop the vehicle and the available energy to power the secondary power source is sufficient to provide a first specified level of vehicle acceleration for a specified amount of time.

41. The method according to claim 40 further comprising:
restarting the ICE when the available energy is just enough to provide a second specified level of acceleration to the vehicle, through the secondary power source, for a specified amount of time.

42. The method according to claim 35 further comprising:
turning the ICE off when the demand for power output terminates and the available energy to power the secondary power source is sufficient to provide a first specified level of vehicle acceleration for a specified amount of time.

43. The method according to claim 42 further comprising: restarting the ICE when the available energy is just enough to provide a second specified level of acceleration to the vehicle, through the secondary power source, for a specified amount of time.

44. The method according to claim 42 further comprising: restarting the ICE when the demand for power output corresponds to a command to accelerate the vehicle above a predetermined acceleration rate.

45. The method according to claim 35 further comprising: turning the ICE off when a command for braking begins if the available energy to power the secondary power source is sufficient to provide a first specified level of vehicle acceleration for a specified amount of time.

46. The method according to claim 45 further comprising: restarting the ICE when the available energy is just enough to provide a second specified level of acceleration to the vehicle, through the secondary power source, for a specified amount of time.

47. The method according to claim 45 further comprising: restarting the ICE when the demand for power output corresponds to a command to accelerate the vehicle above a predetermined acceleration rate.

48. The method according to claim 35 further comprising: turning the ICE off when the vehicle's speed falls below a first selected threshold and the available energy to power the secondary power source is above a second selected threshold.

49. The method according to claim 48 further comprising: restarting the ICE when the available energy is just enough to provide a specified level of acceleration to the vehicle, through the secondary power source, for a specified amount of time.

50. The method according to claim 48 further comprising: restarting the ICE when the demand for power output corresponds to a command to accelerate the vehicle above a predetermined acceleration rate.

51. The method according to claim 35 further comprising: monitoring the amount of available energy; and comparing the amount of available energy to a table of pre-established torque and pre-established acceleration values to determine whether the amount of available energy is sufficient to provide a specified level of vehicle torque, or sufficient to provide a specified level of vehicle acceleration for a specified amount of time.

52. The method according to claim 51 wherein the amount of available energy is a unit of electric energy.

53. The method according to claim 51 wherein the amount of available energy is a unit of hydraulic pressure.

54. The method according to claim 35 further comprising: monitoring an amount of reserve energy stored within the energy storage device;
determining when a demand for additional ICE power output will result in a transmission downshift event; and
utilizing the amount of reserve energy to power the secondary power source and provide supplemental power to the vehicle, the vehicle thereby being powered by both the ICE and the secondary power source until the demand for additional ICE power is terminated or the amount of reserve energy is depleted.

55. A method of operating a hybrid vehicle having, as a primary power source, an internal combustion engine, and having a secondary power source, the method comprising:
operating the vehicle under power from the primary power source; and
shutting off the primary power source during a braking event and operating the vehicle under power from the secondary power source, if an intent to stop is indicated.

56. The method according to claim 55 wherein an intent to stop is indicated if the vehicle speed drops below a speed threshold during the braking event.

57. The method according to claim 56 wherein the speed threshold is 5 mph.

58. A method of operating a hybrid vehicle comprising:
monitoring a braking event;
monitoring an amount of available energy stored within an energy storage device to power a secondary power source;
detecting a demand for power output following the braking event;
utilizing the amount of available energy to initially power the secondary power source and thereby propel the vehicle in response to the demand for power output if the available energy is above a first selected level;
switching to the use of power provided by a primary power source to continue meeting the demand for power output when the secondary power source is initially used and the amount of available energy is subsequently depleted; and
continuing, immediately following the switching step, to utilize power provided by the primary power source, instead of the secondary power source, to meet any additional demands for power output until another braking event is detected, regardless of the amount of available energy.

* * * * *